United States Patent [19]

Hashimoto

[11] Patent Number: 5,200,888
[45] Date of Patent: Apr. 6, 1993

[54] METHOD FOR AUTOMATICALLY DESIGNING A PROGRAM STRUCTURE

[75] Inventor: Masaaki Hashimoto, Kyoto, Japan

[73] Assignee: ATR Communication Systems Research Laboratories, Kyoto, Japan

[21] Appl. No.: 536,919

[22] Filed: Jun. 12, 1990

[30] Foreign Application Priority Data

Jun. 14, 1989 [JP] Japan .................................. 1-151949
May 28, 1990 [JP] Japan .................................. 2-138712

[51] Int. Cl.$^5$ ........................ G06F 15/20; G06G 7/48
[52] U.S. Cl. ................................... 364/400; 364/419; 395/922
[58] Field of Search ................ 364/400, 419; 395/919, 395/922, 700, 902, 50

[56] References Cited

U.S. PATENT DOCUMENTS 4,841,441 6/1989 Nixon et al. ...................... 364/419
5,043,891 8/1991 Goldstein et al. ................ 364/419

OTHER PUBLICATIONS

Proceedings 10th International Conference on Software Engineering, Apr. 11-15, 1988-Singapore, pp. 231-240, "Modeling of Data-Processing Software for Generating and Reusing their Programs", N. Mano.
IEEE Transactions on Software Engineering, vol. SE-9, No. 3, May 1983, pp. 267-279, "Compilation of Nonprocedural Specifications into Computer Programs", N. S. Prywes et al.
Jackson, "Principles of Program Design", Academic Press (1975) pp. 151-168 and 221-235.

Primary Examiner—Roy N. Envall, Jr.
Assistant Examiner—Laura Brutman
Attorney, Agent, or Firm—Lowe, Price, LeBlanc & Becker

[57] ABSTRACT

In a development portion (2) of a directed graph, when a program specification (1) is provided, descriptive elements having characteristics of sets described in the specification and descriptive elements defining a calculation method described therein are mapped with vertices and arcs based on descriptive elements defining a calculation method described therein are drawn between the vertices. Thus, the program specification is developed to the directed graph. The developed directed graph is analyzed by an analyzing portion (3) in view of the characteristics of sets and mappings and global characteristics of the directed graph, and arcs and vertices where flows of execution timing of the calculation synchronize and arcs and vertices where flows of execution timing of the calculation do not synchronize are detected. A program structure defining portion (4) handles the arcs and vertices where the flows of timing synchronize and the arcs and vertices where the flows do not synchronize, by different methods, thereby determining a data structure and a procedure structure as the program structure.

4 Claims, 9 Drawing Sheets

FIG.2

```
00 INFORMATION
01  E product
02      EN-50
03      K name   STR
04      A price  NUM
05  R sold
06      C .product
07          RN M
08      C .sale
09          RN 1
10  E sale
11      EN-100
12      K number    NUM
13      A quantity  NUM
14      A amount    NUM
15        = .sold..product.price × quantity
16  R buy
17      C .sale
18          RN 1
19      C .customer
20          RN M
21  E customer
22      EN-50
23      K name   STR
24      A total  NUM
25        = SUM(.buy..sale.amount)
26 DATA
27  I product_data
28      IX product_index
29      G product_record ON ENDOFFILE(product_file)
30      Q product_record
31          %12s product_name
32              = product.name
33          %8d product_price
34              = product.price
35  I sale_data
36      IX sale_index
37      G sale_record ON ENDOFFILE(sale_file)
38      Q sale_record
39          %4d sale_number
40              = sold..sale.number
41              = buy..sale.number
42          %16s sale_customer
43              = buy.customer.name
44          %12s sale_product
45              = sold..product.name
46          %4d sale_quantity
47              = sale.quantity
48  I account_data
49      IX account_index
50      G account_record ON ENTITYNUMBER(sale)
51      Q account_record
52          %4d sale_number
53              = sale.number
54          %8d sale_amount
55              = buy..sale.amount
56              = sale.amount
57          %16s sale_costmer
58              = buy..costmer.name
59          %10d custmer_total
60              = custmer.total
61 ACCESS
62  D product_file INPUT 20 product_data
63  D sale_file    INPUT 36 sale_data
64  D account_file OUTPUT 38 account_data
```

PSDL PROGRAM SPECIFICATION

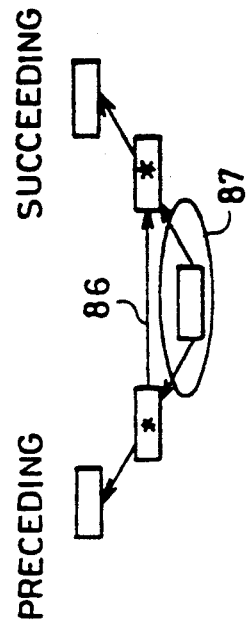
FIG. 7(a)
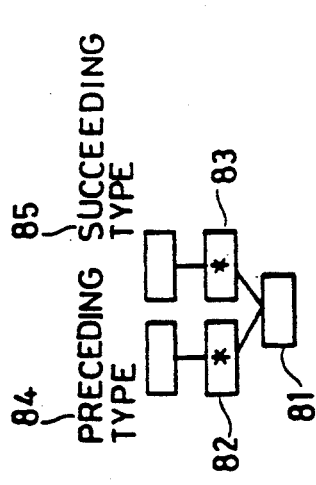
FIG. 7(b)
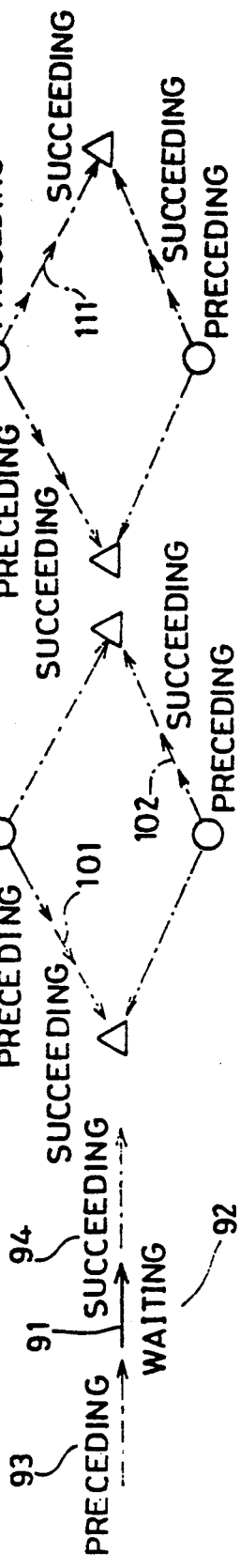
FIG. 8(a)
FIG. 8(b)
FIG. 8(c)

METHOD FOR AUTOMATICALLY DESIGNING A PROGRAM STRUCTURE

BACKGROUND OF THE INVENTION

1. Field of the Invention

The present invention relates to a method for automatically designing a program structure. More specifically, the present invention relates to a method for automatically designing a structure of a program represented by a procedural programming language from a program specification described by a nonprocedural program specification description language by utilizing a computer.

2. Description of the Background Art

A problem called structure clashes between input/output data occurs in design of program structure. This problem also means that synchronization can not be attained in flow of calculation execution timing. This problem is pointed out in "Principles of Program Design" by M. A. Jackson, p. 299, Academic Press, London (1975) (Japanese Translation by Koji Torii, p. 318, issued by Japan Computer Institute, Tokyo (1980)). Conventionally, this problem has been dealt with by the following three methods.

(1) After a programmer detects structure clashes and solves them, he describes a program specification by a nonprocedural program specification description language from the result of the solution. Consequently, when a structure of a program represented by a procedural programming language is automatically designed from the program specification, detection and solution of structure clashes are not required.

(2) A programmer describes a program specification without being aware of structure clashes, namely, without detecting and solving the structure clashes. In addition, detection of structure clashes is not effected at the time of automatically designing a program structure represented by a procedural programming language from the program specification, and a program structure is automatically designed on the assumption that structure clashes always exist.

(3) The programmer describes a program specification without being aware of structure clashes, using a nonprocedural MODEL language characterized by having functions applicable to arrays and array elements. Consequently, at the time of automatically designing a structure of a program represented by a procedural programming language from the program specification, structure clashes are detected and solved.

The MODEL language is described by N. S. Prywes, A. Pnueli in "Compilation of Nonprocedural Specifications into Computer Programs", IEEE Trans. Softw. Eng., Vol. SE-9, No. 3, pp.267-279 (1983).

According to Japanese Patent Laying-Open No. 63-14240 (filed May 29, 1987) entitled "Method for Converting Computer Program Codes" (counterpart U.S. patent application Ser. No. 882737), there is disclosed a method for automatically generating a program represented by a procedural programming language from a nonprocedural language characterized by having functions applicable to arrays and array elements; however, this method does not include automatically detecting and solving structure clashes.

Structure clashes of input/output data are originally problems occurring at the time of designing a program structure. Thus, the structure clashes are problems related with design of program structure and it should not be taken into account in a program specification for representing program functions. Therefore, program specifications taking account of structure clashes and requiring a programmer to be conscious of such clashes cause obstruction to easiness of description and understanding of program specifications. The method described in (1) above involves such factors of obstruction and therefore involves a problem.

If structure clashes exist and they can not be solved by sorting of input data, it is necessary to solve the structure clashes using areas capable of storing many data defined in a main storage or a secondary storage of a computer. More specifically, it is necessary to synchronize flows of timing by waiting attained by temporarily storing many data into array variables defined in the main storage, and files or data bases defined on the secondary storage.

On the other hand, if no structure clash exists, array variables, files or data bases are not required and the data can be processed by using scalar variables defined in the main storage. As a matter of course, the program execution efficiency in the case of processing data using scalar variables is better than that in the case of processing data using array variables, files or data bases. Consequently, in order to enhance the program execution efficiency, it is necessary to detect a portion where a structure clash exists, to assign an area capable of storing many data defined in the main storage or secondary storage for only that portion, and to assign a scalar variable in the main storage for the other portions where no structure clash exists.

However, according to the above described method of (2), the areas capable of storing many data defined in the main or secondary storage are assigned to the portions to which the scalar variables in the main storage are applicable, and consequently the method of (2) involves a problem in program execution efficiency.

According to the above described method of (3), at the time of automatically designing a program structure represented by a procedural programming language from a program specification, structure clashes are detected and solved. However, the detection and solution are made by using characteristics of arrays of the nonprocedural MODEL language and since sets and mappings are more abstract concepts than the arrays, the above mentioned method is not applicable to detection and solution of structure clashes mappings using the characteristics of sets and mappings.

With regard to program input/output data, it has a data format and at the same time it represents information. The information is defined by a universe of discourse to be processed by a program, while the data format is defined by taking account of not only the information but also the processing efficiency of the program. Thus, since the information and the data format are defined by different factors, it is necessary to classify program specifications for the information and the data format and to describe the program specifications by a method suited for each of the information and the data format, thereby making it easy to describe and understand the program specification.

As for the data format, it is suited for description by a description method including arrays as descriptive elements but as for the information, it is necessary to describe it by descriptive elements having the characteristics of sets and mappings capable of representing a universe of discourse as it is recognized. However, the language mentioned in (3) above does not have descriptive elements having characteristics of sets and mappings and accordingly, there is a problem in attaining easy description and easy understanding of program specifications.

SUMMARY OF THE INVENTION

Therefore, a principal object of the present invention is to provide a method of automatically designing a program structure, which makes it unnecessary for a programmer to be aware of structure clashes because of easiness of description and understanding of a program specification and in which structure clashes are automatically detected and solved based on the program specification described by descriptive elements having characteristics of sets and mappings and thus a good execution efficiency is attained.

The present invention includes a method for automatically designing a structure of a program represented by a procedural programming language from a program specification described by a nonprocedural program specification description language, the program specification being characterized by having: descriptive elements having characteristics of sets; descriptive elements having characteristics of mappings for mapping of the set elements between the sets; and descriptive elements for defining a calculation method necessary for obtaining a value of a set element with respect to the set elements mapped by the mappings. The method for automatically designing a program structure includes the steps of: detecting a portion where flows of calculation execution timing for the respective set elements synchronize and a portion where flows of execution timing do not synchronize, by analyzing the program specification; and defining a data structure and a procedure structure as the program structure by handling the portion where the flows of execution timing synchronize and the portion where the flows of execution timing do not synchronize by different methods.

Therefore, according to the present invention, the programmer does not need to be conscious of structure clashes and it is possible to automatically design a program structure with a good execution efficiency by detecting and solving structure clashes in input/output data from a program specification which can be described by descriptive elements having characteristics of sets and mappings and which is easy to describe and understand.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram for explaining a program specification description language.

FIG. 7, consisting of 7(a) and 7(b), shows diagrams for explaining an execution order by data format.

FIG. 8, consisting of 8(a)–8(c), shows diagrams for explaining 2-way circuits.

DESCRIPTION OF THE PREFERRED EMBODIMENTS

Figure 1:
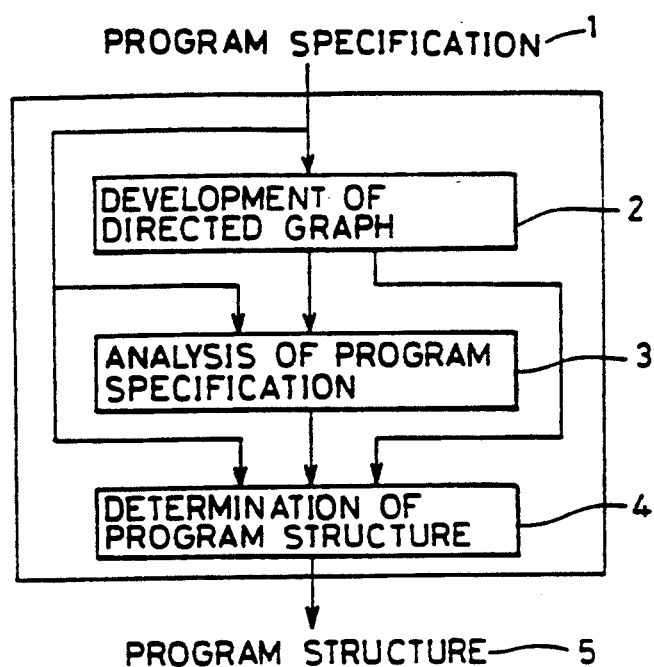
FIG. 1 is a diagram showing a structure of an embodiment of the present invention.

FIG. 1 is a schematic block diagram showing a structure of an embodiment of the present invention. Referring to FIG. 1, this embodiment comprises a directed graph development portion 2, a program specification analyzing portion 3, and a program structure defining portion 4, and those portions are formed by a well-known computer including a central processing unit and a memory. When a program specification 1 is inputted to the directed graph developing portion 2, the portion 2 mappings a descriptive element having a characteristic of a set or mapping described in the specification and a descriptive element defining a calculation method with a corresponding vertex, prepares a directed graph by drawing arcs based on the descriptive element defining the calculation method between the vertices, and provides the graph to the program specification analyzing portion 3.

The program specification analyzing portion 3 analyzes the above mentioned directed graph and the program specification in view of the characteristics of sets and mappings and global characteristics of the directed graph. Then, the program specification analyzing portion 3 detects arcs and vertices where flows of calculation execution timing synchronize, and arcs and vertices where the flows do not synchronize, and provides the results of the detection to the program structure determining portion 4.

The structure determining portion 4 determines a data structure based on the directed graph and program specification added to the above mentioned results of the detection, so as to assign a scalar variable in the main storage of the computer where only one of set elements can be stored, to each of the descriptive elements having characteristics of sets corresponding to the detected vertices where the flows of execution timing synchronize. The portion 4 determines a data structure so as to assign an area in the main storage or secondary storage of the computer where many elements of sets can be stored, to each of the descriptive elements having characteristics of sets corresponding to the detected vertices where the flows of execution timing do not synchronize.

In addition, the program structure determining portion 4 effects waiting by storing many set elements in the above mentioned area, thereby executing calculation while synchronizing the flows of calculation execution timing. Calculation corresponding to the vertices joined only by the arcs where synchronization of the flows of execution timing is detected is performed in the same procedure block. A procedure structure is defined so that calculation corresponding to the vertices joined by the arcs where asynchronization of the flows of execution timing is detected can be executed in different procedure blocks, and the data structure and the procedure structure are provided as a program structure 5.

An example of use of one embodiment of the present invention is that a program represented by a procedural programming language such as the C language or the COBOL language is automatically created by supplying the above mentioned program structure 5 to a program code generator. Another example of use is that a programmer codes a program based on the above mentioned program structure 5.

Figure 3:
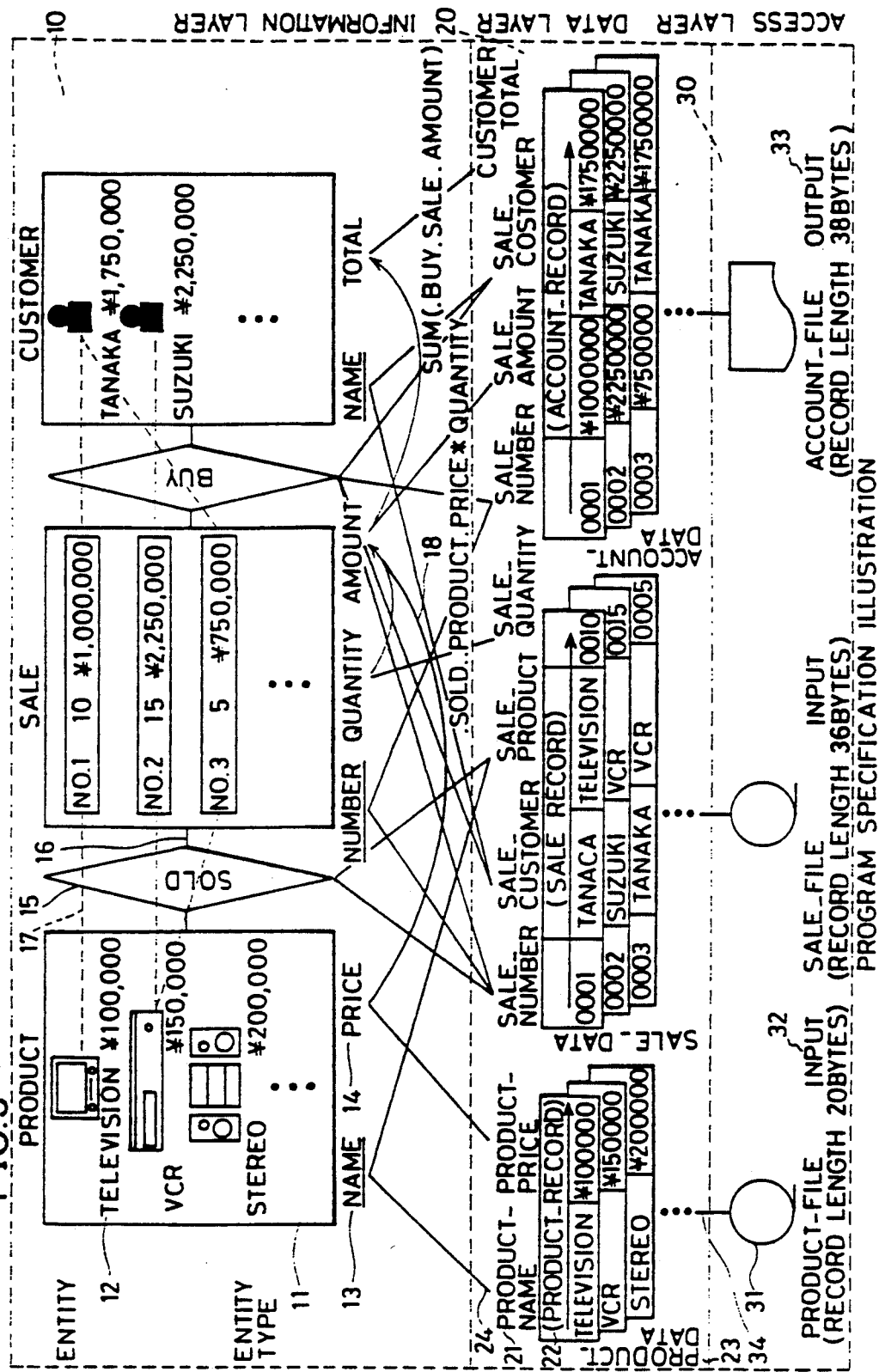
FIG. 3 is a diagram for explaining contents of an example of a program specification.

FIG. 2 is a diagram for explaining a program specification description language, and FIG. 3 is a diagram for explaining contents of an example of a program specification.

Referring to FIGS. 2 and 3, an example of the program specification description language will be described. This language is called PSDL (Program Specification Description Language) and a program specification is described by the language by dividing it into the following three layers. First of all, description is made of an information layer for describing an entity type, a relationship type, attributes and constraints. The information layer is described by PSDL between the INFORMATION statement (INFORMATION-layer statement) shown in the 00th line in FIG. 2 and the DATA statement (DATA-layer statement) shown in the 26th line. In FIG. 3, it is represented in 10 in an upper rectangle surrounded by the dotted lines.

Entity Type

"Things" or "events" existing in the universe of discourse are called entities and a set according to the types of the entities is called an entity type. The entity type is described by PSDL by the E statement (Entity-type statement) shown in the 01st line in FIG. 2. At the time of executing a program, the number of entities appearing in the entity type is described by the EN statement (Entity Number statement) shown in the 02nd line in FIG. 2. If the number of entities is determined, an integer value is described. If the maximum number of entities is determined, it is described in the form of "—maximum number" in the 02nd line. For example, "—50" in the 02nd line indicates that the maximum number is 50. If the number of entities is not fixed, "M" is described. In FIG. 3, the entity type is represented by a rectangle 11 of solid lines. Several entities 12 are represented in the rectangle. Since the entity type is a set of entities, E statement is a descriptive element having the characteristic of set.

Attributes and Primary Key Attributes characteristics of the entities are represented by values of attributes. A special attribute used for identifying the respective entities in the set called the entity type is called a primary key. The primary key attribute is described in PSDL by the K statement (primary Key statement) shown in the 03rd line in FIG. 2, subsequent to the E statement of the entity type.

The attributes other than the primary key are called non-primary key attributes and they are described by the A statement (Attribute statement) shown in the 04th line in FIG. 2. In FIG. 3, the primary key attribute is represented by an underlined attribute name 13 under the rectangle 11 representing the entity type, and the non-primary key attribute are represented by a non-underlined attribute name 14.

"NUM" described in the K statement or the A statement indicates that the value of the attribute is a number (NUMber) and "STR" indicates that the value of the attribute is a string (STRing). Any number of primary key attributes and non-primary key attributes may be determined for one entity type.

Relationship type

A mutual correspondence of entities is called a relationship and a set of relationships according to the types is called a relationship type. The relationship type is described in PSDL by the R statement (Relationship-type statement) shown in the 05th line in FIG. 2.

Subsequent to the R statement, the entity types to which entities mapped by the relationships belongs are described by two or more C statements (Collection statements) shown in the 06th line and the 08th line in FIG. 2. A role to be played by the entity in the relationship is added to the C statement and the statement is punctuated by a period and is described in the form of a "role.entity type".

In FIG. 3, the relationship type is represented by a rhombus 15 and it connects the entity types by solid line 16. The relationship is represented by dotted lines 17 connecting the entities. With regard to the number of relationships connected with one entity, there are three cases, i.e., a case of one relationship, a case of plural relationships, and a case of no relationship (0). The RN statement (Relationship Number statement) in the 07th line and the 09th line in FIG. 2 describe those numbers. If all entities in the entity type have the same number of relationships, the integer value is described. If the maximum value of relationships related with the entities in the entity type is defined, it is described in the form of "—maximum number". If the maximum number is not fixed, it is described as "M".

A relationship type can also be defined in the same entity type and in that case description of a role is indispensable. For example, in a relationship type "couple" defined in the same entity type "persons", one of the entities plays the role of a husband and the other entity plays the role of a wife. This relationship type is described as follows.

E person
      K name STR
      A age NUM
    R couple
      C husband.person
      C wife.person If the entity types mapped by the relationship type are different, a role may not be provided as in the C statement shown in the 06th line and the 08th line in FIG. 2.

Since the relationship type is a set of relationships, the R and C statements are descriptive elements having characteristics of sets. At the same time, since a relationship mappings entities with each other, the R and C statements are also descriptive elements having characteristics of mappings. Thus, the RN statement is a descriptive element for defining a quantity relation of mappings.

Attribute value dependency constraint

A calculation method defined for calculating and obtaining an attribute value of an entity from an attribute value of other entity mapped with that entity by a relationship is called an attribute value dependency constraint. A value of other attribute of the entity where the above mentioned attribute value to be obtained may be referred to for calculation. The attribute whose value is to be obtained needs to be a non-primary key attribute.

This constraint is described in PSDL by the=statement shown in the 15th line in FIG. 2, subsequent to the A statement describing the non-primary key attribute. The symbol "*" in the=statement in the 15th line is a calculation operator indicating multiplication. In FIG. 3, the attribute having the value to be obtained and the attribute having the value to which reference is made are connected by a curve 18 having an arrow.

If reference is made, in the=statement, to an attribute value of an entity different from the entity having the value to be obtained, it is described in the form of "role 1.relationship type.role 2.entity type.attribute" punctuated by periods. In this form, the role 1 is the role of the entity having the attribute value to be obtained, and the role 2 is the role of the entity having the attribute value to which reference is made. The roles may be omitted for the same reason as described above with regard to the relationship type. In FIG. 2, roles are not provided. If reference is made to a value of other attribute in the entity where a value is obtained from the=statement, it is described simply by "attribute". The=statement defining the attribute value dependency constraint is a descriptive element for defining the calculation method.

Entity existence dependency constraint

A calculation method defined for obtaining other entity based on a certain entity is called an entity existence dependency constraint. As for the obtained entity, a value of the primary key attribute needs to be calculated and obtained from the attribute value of the entity on which the existence of that entity is based.

Therefore, this constraint is described in PSDL by the=statement subsequent to the K statement describing the respective primary key attributes, in the following manner.

```
E entity-type
    K primary-key-1 STR
        = function-1 (parameter-11, parameter
            -12, - - -, parameter-1n
    K primary-key-2 NUM
        = function-2 (parameter-21, parameter
            -22, - - -, parameter-2m)
```

In this case, all parameters "parameter−11, −12, - - -, parameter−1n, parameter−21, parameter−22, - - -, parameter−2m" of functions "function-1, function-2" are described in the form of "role 1.relationship type role 2.entity type.attribute" punctuated by periods. The role 1 is the role of the obtained entity, and the role 2 is the role of the entity on which the existence of that entity is based. The roles may be omitted for the same reason as described above with regard to the relationship type.

In this constraint, not only functions but also expressions including arithmetic operation symbols and string operation symbols may be described. If any number of entities having the same primary key attribute value are obtained, those entities are regarded as one entity and thus only one entity exists which has the primary key attribute value. The=statement defining the entity existence dependency constraint is a descriptive element for defining the calculation method.

Relationship existence dependency constraint

A calculation method defined for obtaining, based on several entities, a relationship existing in those entities is called a relationship existence dependency constraint. This constraint is described in PSDL by the RC statement (Relationship existence dependency Constraint statement) subsequent to the R statement, C statement and RN statement describing the relationship type.

```
R relationship-type
    C role-1.entity-type-1
    RN 1
    C role-2.entity-type-2
    RN M
```

```
RC predicate (parameter-1, parameter-2),
    - - -, parameter-n)
```

In this case, all parameters "parameter−1, parameter−2, - - -, parameter−n" of the predicate are described in the form of "role.entity type.attribute" punctuated by periods. The "role.entity type" in this form is equal to any description in the above mentioned C statement and the "attribute" is the attribute of the entity type. The role may be omitted for the same reason as described above with regard to the relationship type.

Therefore, a predicate is applied to each group of entities taken out one by one arbitrarily from the entity types mapped by the relationship type and if the predicate becomes true, this means that a relationship exists between the entities. In this constraint, not only predicates but also condition expressions including arithmetic comparison symbols or string comparison symbols may be described. The RC statement defining the relationship existence dependency constraint is a descriptive element for defining a calculation method.

Data layer

The data layer is described in PSDL between the DATA statement (DATA-layer statement) shown in the 26th line in FIG. 2 and the ACCESS statement (ACCESS-layer statement) in the 61st line. In FIG. 3, the data layer is represented in a rectangle 20 in the middle portion surrounded by dotted lines.

Element data type

The element data type is a type of data which would not have meaning if it were further divided. This data type is described in PSDL by the % statement shown in the 31st line in FIG. 2. "% 12s" in the % statement defines a data format of a string formed by 12 characters as in the program language C. In FIG. 3, the element data type is represented by a field 21 in the record.

Sequence group data type

A type of data formed by arranging sequentially the data taken out one by one from several data types is called a sequence group data type. This data type is described in PSDL by the Q statement (seQuence group data type statement) shown in the 30th line in FIG. 2. The data type used for defining the sequence group data type is described subsequent to the Q statement. If the data type used for the definition is the element data type, it is described by the % statement as shown in the 31st line and the 33rd line in FIG. 2.

On the other hand, if the data type used for the definition is any of the sequence group data type, the iteration group data type described below, and the selection group data type, it is described by the following G statement (Group data type statement).

G Group-data-type

In FIG. 3, the sequence group data type is represented by a record 22 where several fields are connected.

Iteration group data type

A type of data formed by repeating several data of the same data type is called an iteration group data type. This data type includes an index for identifying individual data in the repetition of the data, and a condition for defining an end of the repetition.

This data type is described in PSDL by the I statement (Iteration group data type statement) shown in the 27th line in FIG. 2. Subsequent to this I statement, the index is described by the IX statement (IndeX statement) shown in the 28th line in FIG. 2. The data type used for the definition of the iteration group data type is described subsequent to the IX statement. In the same manner as described above with regard to the sequence group data type, the data type used for the definition is described by the % statement or the G statement according to the type.

The condition for defining the end of the repetition is described by an ON phrase at the end of the statement describing the data type used for the definition. For example, the ON phrase "ON ENDOFFILE (product-file)" described in the 29th line in FIG. 2 indicates that the repetition of data is terminated when EOF (End Of File) indicating an end of file is detected from the product-file.

The ON phrase "ON ENTITYNUMBER (sale)" described in the 50th line in FIG. 2 indicates that the repetition is terminated if the number of repetitions of data is equal to the number of entities of the entity type "sale". In FIG. 3, the iteration group data type is represented by a repetition 23 of several records.

Selection group data type

A type of data appearing only as one data among the data of several types is called a selection group data type. This data type is accompanied by a condition of data type selection. The selection group data type is described in PSDL by the S statement (Selection group data type statement) as indicated below.

---

S Selection-group-date-type-1
   %10s elementary-data-type-1 ON predicate-1
   (parameter-1)
   %10d elementary-data-type-2 ON predicate-2
   (parameter-2)
   %10s elementary-data-type-3 ON predicate-3
   (parameter-3)

---

The data type used for the definition of the selection group data type is described subsequent to the S statement describing the selection data type. The data type used for the definition is described by the % statement or the G statement according to the type in the same manner as described above with regard to the sequence group data type.

The data type selection condition is described by an ON phrase at the end of the statement describing the data type used for the definition. The predicate portion "predicate-1, predicate-2, predicate-3" in the above mentioned ON phrase represents the data type selection condition, and in the parameters "parameter-1, parameter-2, parameter-3" of the predicate portion, the element data type, the indices or attributes can be described. If the predicate-1 (parameter-1) is true, the elementary-data-type-1 is selected. If the predicate-2 (parameter-2) is true, the elementary-data-type-2 is selected. If the predicate-3 (parameter-3) is true, the elementary-data-type-3 is selected. Not only the form of a predicate, but also condition expressions including arithmetic comparison symbols or string comparison symbols may be described. Thus, the data types are defined hierarchically and therefore they constitute a tree structure. The element data types correspond to the positions of leaves of the tree structure. It is assumed that the data type positioned in the root of the tree structure has only one data. This data is transmitted while being analyzed toward the direction of the leaves in the tree structure and finally it becomes data of the element data type.

Since each data type is a set of data, the % statement, the Q statement, the I statement and the S statement are descriptive elements having characteristics of sets. In addition, since the sequence group data type, the iteration group data type and the selection group data type are mapped with the data belonging to the component data type used for the definition and the data belonging to the data type of itself, the Q statement, the I statement and the S statement are also descriptive elements having characteristics of mappings for mapping the respective set elements.

Information layer-data layer mapping constraint

This constraint is described to connect the data layer and the information layer. The values of input/output data or indices represent information of the universe of discourse and framing of the information is defined as an entity type, an attribute or a relationship type. In consequence, the values of the input/output data and the indices are regarded as representing the entity, the attribute value or the relationship.

As to the expression of the entity, the condition indicating which element data type or index represents an entity of the corresponding entity type is called a constraint concerning expressions of entities.

This constraint is described in PSDL by the=statement shown in the 32nd line in FIG. 2, subsequent to the % statement describing the element data type. The=-statement of the constraint may be described subsequent to the IX statement describing the index. The=statement is described in the form of "entity type.primary key attribute" punctuated by a period..

As to the expression of the relationship, the entities mapped by the relationship should be expressed simultaneously. The condition defined for indicating which element data type or index expresses an entity mapped by the relationship of the corresponding relationship type is called a constraint concerning expressions of the relationships and entities.

This constraint is described in PSDL by the=statement shown in the 40th line and the 45th line in FIG. 2, subsequent to the % statement describing the element data type. The=statement of this constraint may be described subsequent to the corresponding IX statement describing the index. Those=statements are described in the form of "relationship type.role.entity type.primary key attribute" punctuated by periods. The role may be omitted for the same reason as described above with regard to the relationship type.

In the case of describing this constraint, two or more=statements need to be described for one relationship type. If two or more=statements are described subsequent to the I statement describing the iteration group data type, the constraint is applied to the data having the same index value.

If the constraint is to be applied to the data having consecutive index values in the same element data type, description is made by adding an ON phrase as described below.

---

Q sequence-group-data-type
IX i ON ENDOFFILE (file)
   %10s elementary-data-type-1
     =relationship-type.role-1.entity-type.primary
     -key-attribute ON PRIOR
     =relationship-type.role-2.entity-type.primary
     -key-attribute ON NEXT
   %5d elementary-data-type-2

--- where "PRIOR" represents a preceding index value and "NEXT" represents a succeeding index value.

As for the expression of attribute values, the condition indicating which element data type or index expresses an attribute of the corresponding entity type is called a constraint concerning expressions of attribute values. However, the attribute needs to be a non primary key attribute. This constraint is described in PSDL by the=statement shown in the 34th line in FIG. 2 subsequent to the % statement describing the element data type. The=statement of this constraint may be described subsequent to the IX statement describing the index. The =statement is described in the form of "entity type.attribute" punctuated by a period.

If the=statement of this constraint is described subsequent to the I statement describing the iteration group data type, the attribute value can be expressed with respect to the entity expressed by the constraint concerning the expression of entities applied to the data having the same index value or the constraint concerning the expression of relationships and entities.

In FIG. 3, the constraint of mapping between the information layer and the data layer is represented by a straight line 24 connecting the element data type or index of the data layer, the primary key attribute or non primary key attribute of the information layer and the relationship type.

Since the information layer-data layer mapping constraint mappings the entity belonging to the entity type or the relationship belonging to the relationship type with the data belonging to the data type and accordingly it is a descriptive element having characteristics of mappings for mapping the respective set elements.

Access layer

The access layer is described subsequent to the ACCESS statement (ACCESS-layer statement) shown in the 61st line in FIG. 2 in PSDL. A file as input/output of a program is called a data set type. However, the file is a sequential access file. The data set type is described in PSDL by the D statement (Data set type statement) shown in the 62nd line in FIG. 2. Input or output usage of the data set type is called an input/output constraint and it is described as "INPUT" or "OUTPUT". An input/output record length is described by a unit of byte. Mapping between the data set type and the data type is called a data layer-access layer mapping constraint and it is described by the data type at the root defined in the tree structure in the data layer.

In FIG. 3, a data set type 31 is represented in a rectangle 30 in the lower part surrounded by dotted lines. The input/output constraint is represented by INPUT 32 or OUTPUT 33. The data layer-access layer mapping constraint is represented by a straight line 34 connecting the data set type and the data type at the root of the above mentioned tree structure.

Since the data type is regarded as a set including one file as an element, it can be regarded as a descriptive element having a characteristic of sets. In addition, since the data layer-access layer mapping constraint mappings the above mentioned one element included in the data set type and the data included singly in the data type at the above mentioned root, it can be regarded as a descriptive element having a characteristic of mappings for mapping the respective set elements.

Development of directed graph

Figure 4:
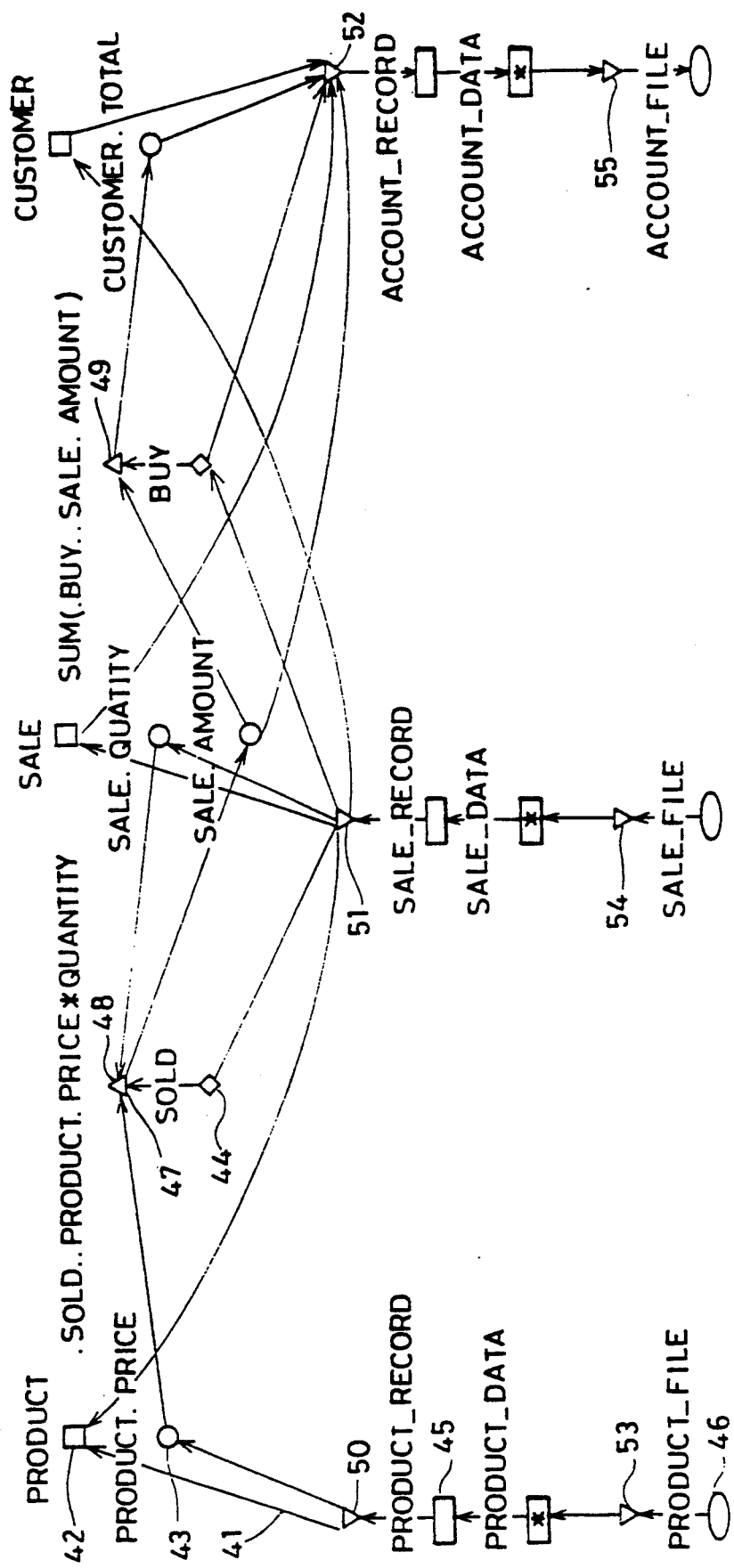
FIG. 4 is a diagram for explaining a directed graph.
Figure 5:
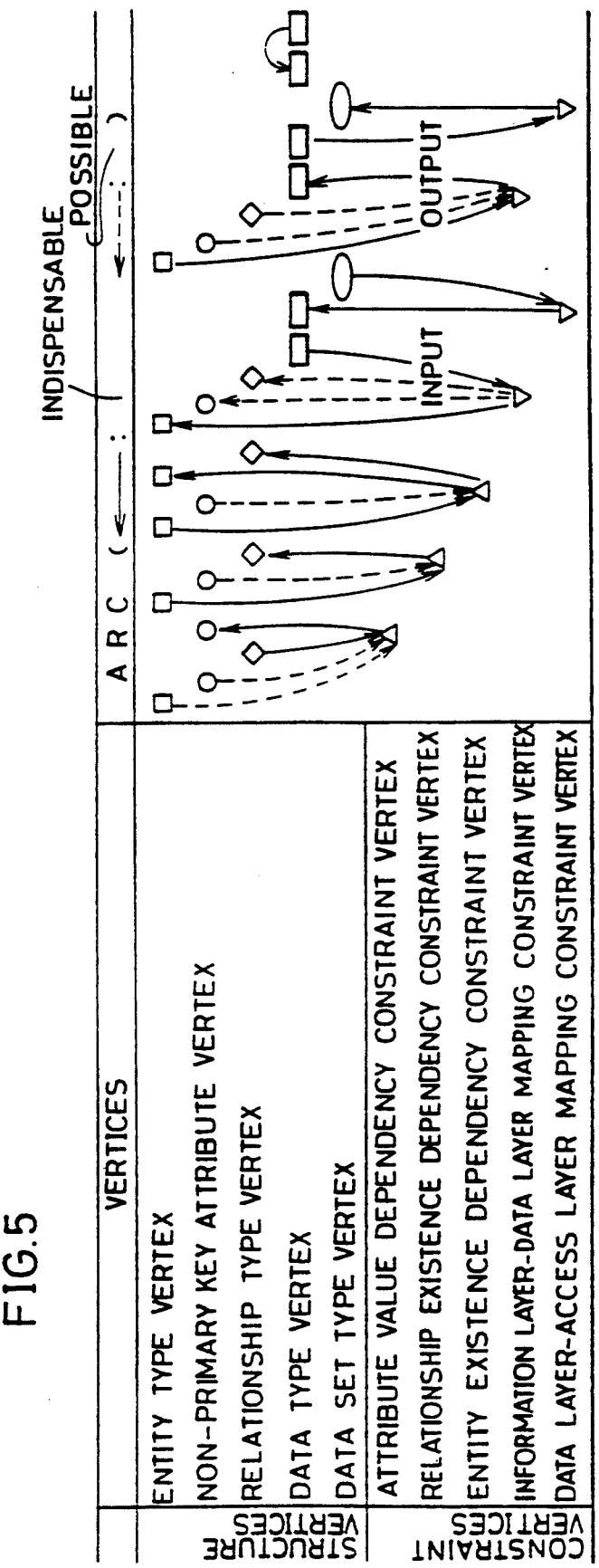
FIG. 5 is a table showing types of vertices and the method for drawing arcs of the directed graph.

FIG. 4 is a diagram for explaining a directed graph, and FIG. 5 is a diagram showing vertices and the method for drawing arcs of the directed graph.

The directed graph is used to analyze program specifications and it includes vertices and arcs. The vertices are as shown in FIG. 5 and they are classified into structure vertices and constraint vertices. The primary key attribute is represented typically by the entity type vertex. The arcs are drawn as shown in FIG. 5 between the structure vertices and the constraint vertices. However, they can be drawn between the data type vertices. The directions of the arcs are those from which the data or values are referred to.

In FIG. 4, the arcs are all represented by arrows 41, while the vertices are represented in the following manner. The entity type vertices are represented by squares 42, the non primary key attribute vertices are represented by rounds 43, the relationship type vertices are represented by rhombuses 44, the data type vertices are represented by rectangles 45, the data set type vertices are represented by ovals 46, and the constraint vertices are represented by triangles 47.

The asterisks in the rectangles indicate that the data type of those vertices is the iteration group data type. As shown in FIG. 4, in the tree structure of data types, only the data type at the root of the tree structure is the iteration group data type and if there is no selection group data type in the tree structure, only the iteration group data type and the data type vertices of the elements are represented in a directed graph. Even if the information layer-data layer mapping constraint is represented as a vertex for each tree structure, there is no difference in results of analysis.

In FIG. 4, the numerals 48 and 49 indicate attribute value dependency constraint vertices, the numerals 50, 51 and 52 indicate information layer-data layer mapping constraint vertices, and the numerals 53, 54 and 55 indicate data layer-access layer mapping constraint vertices.

Since evaluation of constraints correspond to execution of programs, the timing for giving occasion of the evaluation is regarded as flowing in the arcs. The arcs are classified into synchronous and asynchronous arcs. In the synchronous arcs, flows of timing synchronize in the synchronous arcs connected through the structure vertices. In the asynchronous arcs, flows of timing do not synchronize in all the arcs connected through the structure vertices. By analysis of program specifications described later, the asynchronous arcs are detected.

Analysis of program specification

Next, an example of analysis of a program specification will be described. Local analysis is made at first by using characteristics of sets and mappings with regard to the directed graph and the program specification. Then, global analysis is made. The local analysis is effected in the following manner.

Union

If two or more arcs flow into an entity type vertex, and if there are entities from the respective arcs having the same primary key attribute value, those entities need to be processed as the same entity, namely, one entity. For this reason, a set of entities reaching from the respective arcs should have union. Consequently, it is necessary to check the primary key attribute values of the entities between the respective arcs. However, except for a special case where input files are sorted, generally, it does not necessarily happen that the entities having the same primary attribute value reach the entity type in synchronization. As a result, the flows of timing in two or more flowing-in arcs do not synchronize.

Only after all entities from two or more arcs have reached and the above mentioned checking has been terminated, the constraints using the attribute values of the entities can be evaluated. Consequently, not only in the entity type vertices but also in the vertices of non-primary key attributes of the entity type, flows of timing do not generally synchronize between the flowing-in arcs and the flowing-out arcs.

However, this does not prevent synchronization of flows of timing between the flowing-out arcs. Accordingly, all the arcs which flow into the entity type vertices and the vertices of non-primary key attributes of the entity type are set to be asynchronous arcs.

Also in case where two or more arcs flow in the relationship type vertex, a union is required for the same reason and consequently all the flowing-in arcs set to be asynchronous arcs.

Quantitative relation of mappings

Let us assume that a value of attribute of a certain entity type is referred to by means a certain relationship type by using the attribute value dependency constraint or the entity existence dependency constraint. In this case, if a value with respect to the above mentioned entity type defined by the RN statement in the above mentioned relationship type is 1, the attribute value of each entity of the entity type is referred to only once. Consequently, the flows of timing synchronize between the arcs flowing into and out of the vertices of the attributes.

If the above mentioned value is not 1 but a value higher than 1 or M, the value of the same attribute of the same entity is referred to twice or more. In this case, except for a special case where input files are sorted, the twice or more references to the same attribute value do not necessarily occur consecutively. Thus, the flows of timing do not generally synchronize between the arcs flowing into and out of the vertices corresponding to the attribute. In this case, the arc flowing out of the vertex corresponds to a value other than 1, defined by the above mentioned RN statement. Accordingly, the arc flowing out of the vertex corresponding to the attribute is set to be an asynchronous arc.

Let us assume a case where an attribute value of a certain entity type is obtained from an attribute value referred to by the attribute value dependency constraint by means of a certain relationship type. In this case, in the above mentioned relationship type, a value higher than 1, or M with respect to the above mentioned entity type defined by the RN statement appears when an set function applied to a value of an unfixed number such as a total number is used.

The set function needs to have a variable for storing an intermediate value and the variable is required for each entity belonging to the above mentioned entity type. For this reason, a program structure is designed so that the variable is provided for each entity. Thus, the same variable is generally modified twice or more. Except for a special case where input files are sorted, the twice or more modifications of the same variable do not necessarily occur consecutively. Therefore, only after all values flow into the attribute, the constraint referring to the final value of the variable as an attribute value should be evaluated. In consequence, flows of timing do not generally synchronize between the arcs flowing into and flowing out of the vertices. In this case, the arc flowing into the vertex corresponds to a value other than 1, defined by the above mentioned RN statement. Thus, the arc flowing into the vertex corresponding to the attribute is set to be an asynchronous type arc.

Let us assume that from an entity of a certain entity type referred to by the entity existence dependency constraint by means of a certain relationship type, an entity of another entity type is obtained. In the above mentioned relationship type, the value defined by the RN statement with respect to the entity type obtained from the entity becomes a value higher than 1, or M when the same entity is obtained from the two or more entities referred to. For this reason, a union needs to be obtained for the same reason as described above in the section of the union. Consequently, for the same reason, the arc flowing into the vertex corresponding to the entity type where the entity is obtained is an asynchronous arc.

In the relationship existence dependency constraint, arbitrary entities are taken out one by one from the respective entity types mapped by the relationship type as described above in regard to the relationship type existence dependency constraint of the program specification describing language, and the predicate described in the constraint needs to be applied to each entity group. For this reason, the same attribute value of the same entity is generally referred to twice or more. Therefore, the value defined by the RN statement can be regarded virtually as M. Consequently, for the same reason as described above, the arcs flowing into the vertex of the relationship existence dependency constraint are asynchronous arcs.

In the above described local analysis, if the vertex connected with an arc determined to be asynchronous is a vertex of an attribute, storage of entities is also required for the purpose of determining which entity each of the stored attribute values belongs to. Thus, the arc connected to the vertex of the entity type having the attribute is also set to be asynchronous.

Figure 6A:
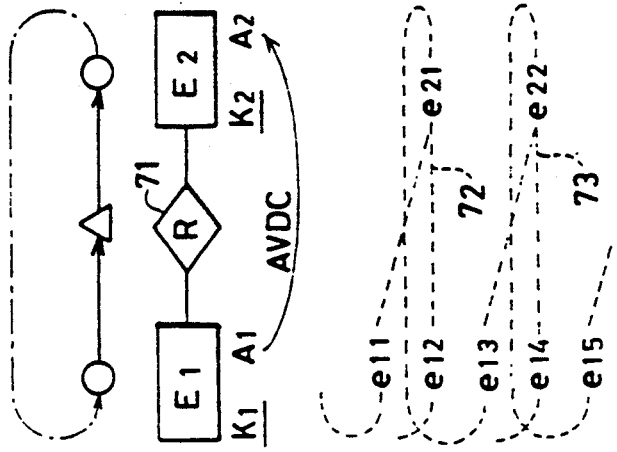
FIG. 6, consisting of 6(a)–6(c), is a diagram showing 1-way circuits.
Figure 6B:
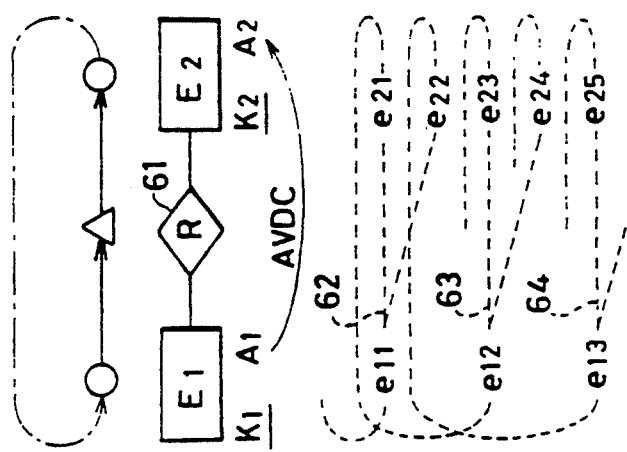
Figure 6C:
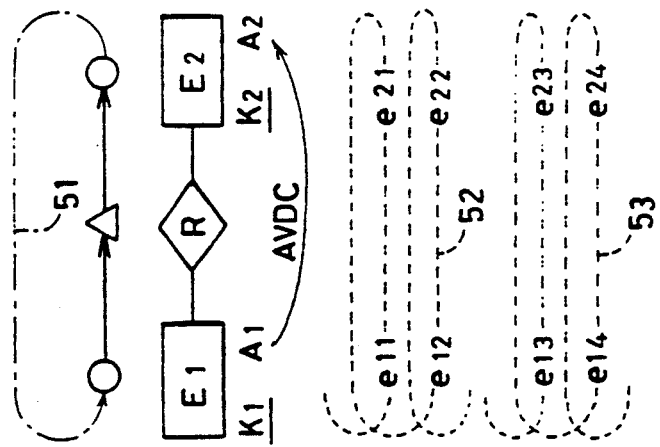

FIG. 6 is a diagram for explaining a 1-way circuit for the purpose of globally analyzing a program specification. As shown in FIG. 6 (a), if a 1-way circuit 51 exists in a directed graph, the connection of entities and relationships does not form a circuit but forms generally a large number of spirals 52 and 53. In this case, the constraint needs to be evaluated according to the spirals. In FIGS. 6 et seq., a directed path formed by connecting arcs having the same direction is shown by chain lines having an arrow.

If the spirals are branched by the line 62 as shown in FIG. 6 (b) and the relationship existence dependency constraint or the entity existence dependency constraint is defined on the relationship type 61 immediately after the branching, a number of timings occur from one timing of the constraint evaluation and such timings occur in several portions 62, 63, 64 on one spiral. Thus, occurrences of timings are represented by mapping with attribute values and a program structure is determined so that procedure is controlled by a data driven system. In consequence, the occurrences of timings and the evaluation of the constraint do not synchronize. In other words, flows of timing do not synchronize. Accordingly, the arc flowing into the structure vertex where occurrence of timing is represented is an asynchronous arc.

If spirals join as lines 72 and 73 shown in FIG. 6 (c) and the relationship existence dependency constraint or the entity existence dependency constraint is defined on the relationship type 71 immediately before the joining, which spirals join is not clear unless the constraint on the circuit is evaluated in advance, and sometimes a spiral joins to the spiral where the evaluation of the constraint is terminated.

Consequently, since re-evaluation of the constraint is required, a program structure is determined so that the procedure is controlled by a so-called back tracking system which cancels the contents calculated till then. When the constraint is re-evaluated, the attribute value is referred to again and set and thus flows of timings do not synchronize. Accordingly, all the arcs connected to the constraint vertices on the circuit are asynchronous arcs.

FIG. 7 is a diagram for explaining a sequence according to a data format, and FIG. 8 is a diagram for explaining a 2-way circuit.

FIG. 7 (a) represents a tree structure where data types are defined hierarchically. It is assumed that two or more iteration group data types 82 and 83 exist in the data type used for definition of a sequence group data type 81. In this case, data of the iteration group data type 83 appears after all data of the iteration group data type 82 have appeared. In consequence, a relation of a preceding type 84 and a succeeding type 85 with respect to the sequence group data type 81, namely, a preceding and succeeding relation exists between the iteration group data types 82 and 83.

In addition, if an asynchronous arc 91 exists as shown in FIG. 8 (a), waiting 92 is effected by storing all attribute values passing through the structure vertex into which or from which the arc 91 flows. A program structure is determined so that the constraint referring to the attribute values is evaluated after completion of the storing. As a result, a relation of a preceding type 93 and a succeeding type 94 with respect to the vertex of waiting, namely, a preceding and succeeding relation exists.

Now, let us consider the 2-way circuit in the directed graph. However, it is assumed that a point of junction of arcs on the circuit is either a constraint vertex or a data type vertex and that a point of branching is a structure vertex. If two iteration data types having the above mentioned preceding and succeeding relation exist in the circuit, a temporary asynchronous arc 86 is drawn from the vertex of the preceding iteration group data type to the vertex of the succeeding iteration group data type as shown in FIG. 7 (b) and instead the arc connected to the vertex of the sequence group data type surrounded by an oval 87 is temporarily deleted.

If one or more asynchronous arcs 101, 102 exist only in the same direction in the circuit as shown in FIG. 8 (e), a structure clash occurs in the preceding and succeeding relation assuming that all other arcs in the circuit are synchronous. In order to solve such clash, at least one of the arcs having the opposite direction to that of such asynchronous arcs and connected to any of the entity type vertex, the non-primary key attribute vertex and the relationship type vertex as shown in FIG. 8(c) is made to be an asynchronous arc 111.

If the vertex connected with the asynchronous arc is a vertex of an attribute, it is also necessary to store the primary key attribute value of the entity for determining which entity each of the stored attribute values belongs to. Thus, the arc connected to the vertex of the entity type having the above mentioned attribute is also asynchronous.

If a new asynchronous arc appears, it happens that a new structure clash exists in a preceding and succeeding relation in other 2-way circuit. In such a case, the structure clash is solved by repeating the above described procedure and if there is no clash, the repetition is terminated.

Determination of a program structure

Next, an example of determination of a program structure will be described. A data structure and a procedure structure as described below are determined as the program structure.

Data structure

A structure vertex into which or from which flows at least an arc determined to be asynchronous by the above mentioned analysis of the program specification is called an asynchronous structure vertex. Other vertices are called synchronous structure vertices. As is understood from the definition of asynchronous arcs described above, with regard to the development of the directed graph, flows of timing do not synchronize at the asynchronous structure vertices and consequently a structure clash exists at such vertices. In consequence, an array variable or a random access file is assigned to such vertices, whereby the structure clash is solved.

If an asynchronous structure vertex is an entity type vertex or an attribute vertex, the EN statement of the entity type is referred to. If a constant value is described in the EN statement, an array having elements corresponding to the number is assigned. If "M" is described in the EN statement, the maximum number of entities is unfixed and accordingly a random access file is assigned. As to the relationship type, a relationship number is obtained by calculation using values described in the EN statements of the entity types which the relationship type connects and a value described in the RN statement of the relationship type. Thus, if the relationship number is obtained, an array having elements the number of which corresponds to the above mentioned number is assigned. On the other hand, if the relationship number is unfixed, a random access file is assigned.

Since a structure clash does not exist in a structure vertex where none of the asynchronous arcs is connected, a scalar value making it possible to store only one of the attribute value, data or relationships is assigned.

Figure 9:
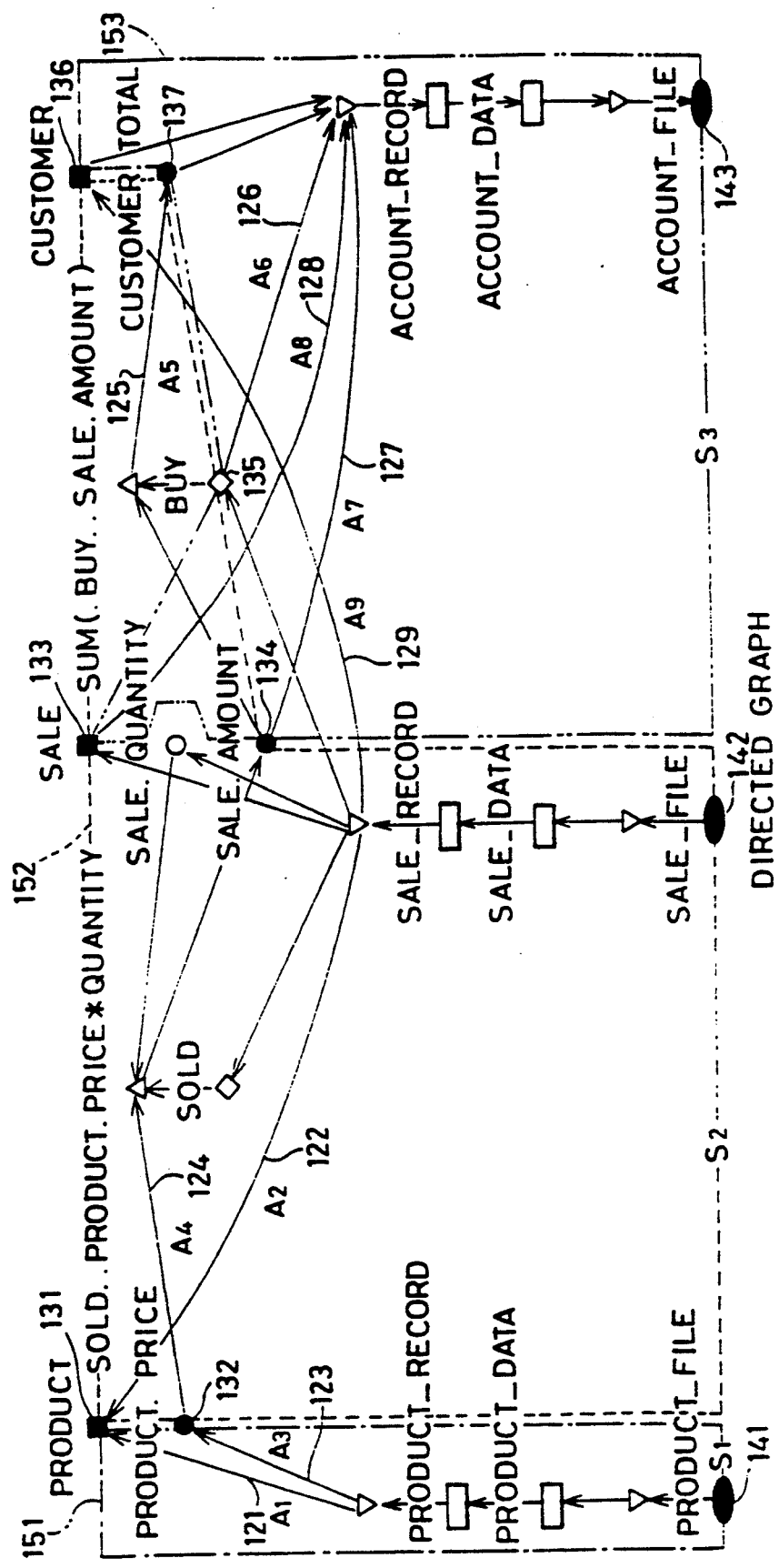
FIG. 9 is a diagram for explaining a synchronous execution area.
Figure 10A:
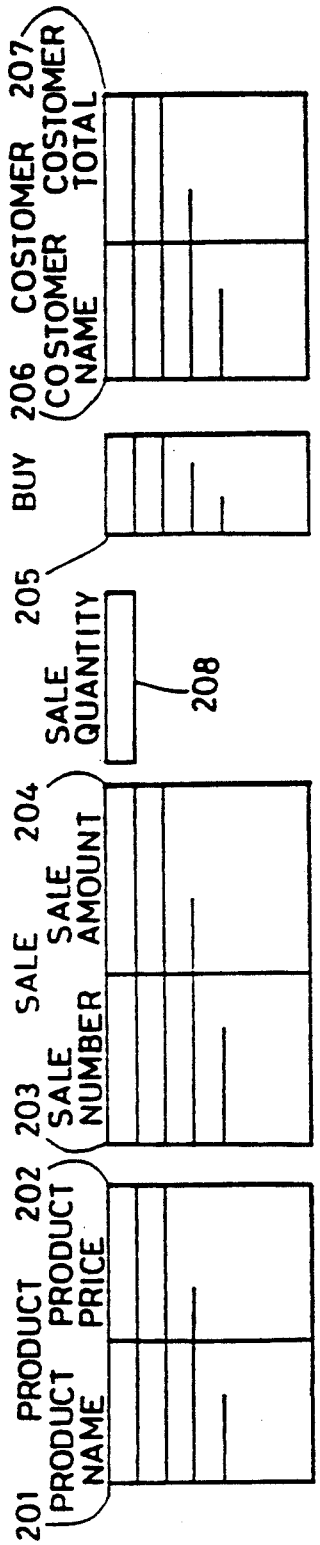
FIG. 10, consisting of 10(a) and 10(b), is a diagram for explaining a program structure.
Figure 10B:
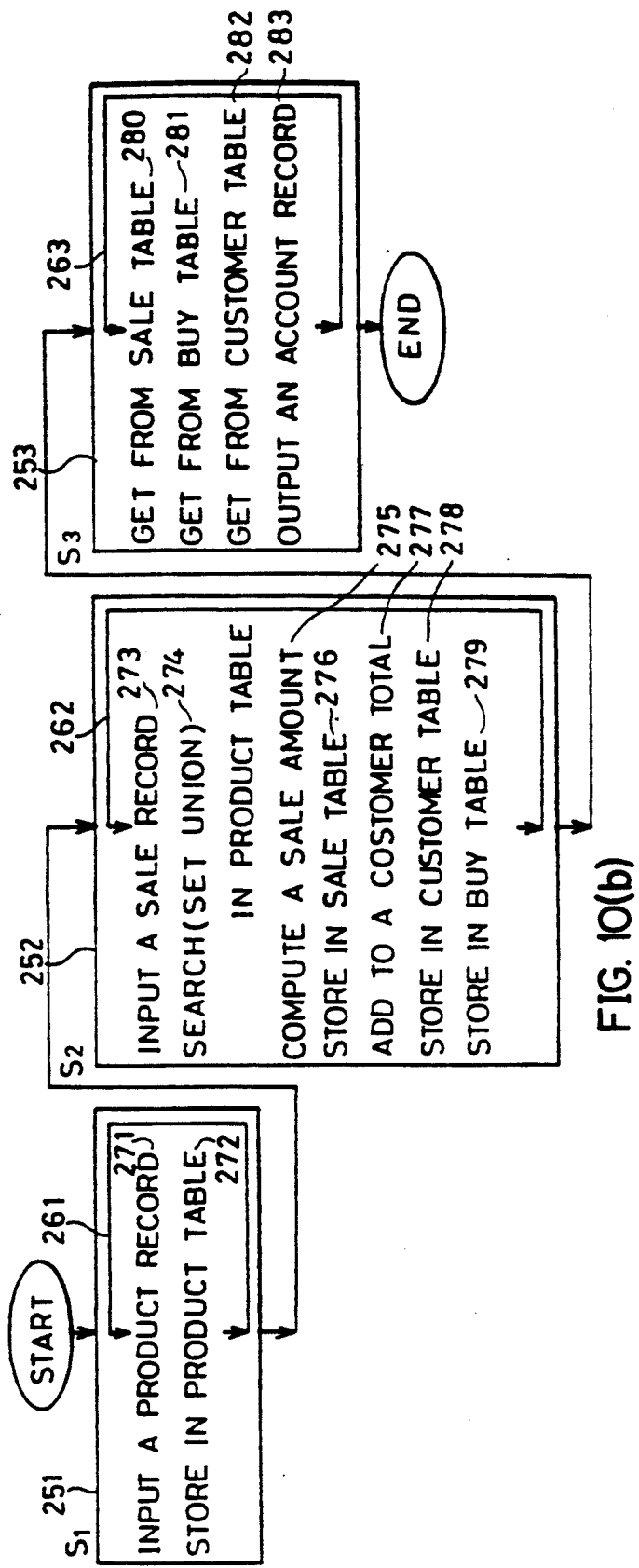

FIG. 9 is a diagram for explaining a synchronous execution area, and FIG. 10 is a diagram for explaining a program structure.

If the directed graph shown in FIG. 4 is analyzed by the above mentioned program analyzing method, asynchronous arcs 121 to 129 shown by the thick line arrows in FIG. 9 are obtained. As a result, the vertices 131 to 137 in FIG. 9 are asynchronous vertices and accordingly array variables "product.name" 201, "product.price" 202, "sale.number" 203, "sale.amount" 204, "buy" 205, "customer.name" 206, "customer.total" 207 are assigned. A scalar variable shown in "sale.quantity" 208 in FIG. 10 (a) is assigned to a synchronous structure vertex. No variable is assigned to a data type vertex.

The arrays or files assigned to the vertices in the 1-way circuit to which the data driven system is applied are provided with variables for storing timing indication flags for respective attributes of entities. The arrays or files assigned to the vertices in the 1-way circuit to which the back tracking system is applied are provided with variable for storing re-evaluation flags for respective attributes of entities.

Procedures structure

First of all, the directed graph is divided into connective graphs described below. The connective graphs have asynchronous structure vertices as boundary vertices and other vertices as internal vertices. A data set type vertex is regarded as an asynchronous structure vertex since it is a file where data is stored. Synchronous arcs adjacent to each other through a vertex fall into the same connective graph. An asynchronous arc and an asynchronous arc adjacent to each other through a constraint vertex fall into the same connective graph.

Thus, a connective graph is called a synchronous execution area and it is mapped with one procedure block in a procedure structure. No structure clash exists in the area. The above mentioned global analysis ensures the below described features. As to adjacent two synchronous execution areas, the arcs flowing into an asynchronous vertices on a border of the two areas are all included in one of the synchronous execution areas, and the other synchronous execution area includes only the arcs flowing out from the asynchronous vertices on the border. This means that a program execution order exists between the two synchronous execution areas. Consequently, a partial order of execution exists among the synchronous execution areas. From this partial order, a total order for determining the execution order of the above mentioned procedure blocks is obtained.

Next, a procedure is assigned to respective constraint vertices or structure vertices in the synchronous execution areas. Since the constraint vertices and structure vertices are connected by the arcs in the synchronous execution area, a partial order exists among those vertices. From this partial order, a total order for determining a procedure execution order is obtained.

One procedure block includes one or more iteration control loops. The control loop is determined by a constraint executed at first in the procedure block as described below.

If a data layer-access layer mapping constraint connected to a data set type vertex for input is executed first, one control loop is assigned to an input file and the loop is iterated for each input record in the file.

If the attribute value dependency constraint is to be executed first, the vertex of only one relationship type appearing in the =statement describing the constraint is asynchronous. One control loop is assigned to the relationship type and the loop is iterated for each relationship.

If the relationship existence dependency constraint is to be executed first, the vertex of one or more entity types connected by the relationship type described in the constraint are asynchronous. One control loop is assigned to each C statement corresponding to the entity type and each loop is iterated for each entity of the entity type.

If the entity existence dependency constraint is to be executed first, the vertices of one or more entity types of which the constraint refers to attribute values are asynchronous. One control loop is assigned to each entity type and the loop is iterated for each entity of the entity type.

If the data layer-access layer mapping constraint connected to an output data set type vertex is to be executed first, one control loop is assigned to the entity type described in the ON phrase of the IX statement of the iteration group data type where the constraint is described, and the loop is iterated for each entity of the entity type.

For example, referring to FIG. 9, the vertices 131 to 137 and 141 to 143 are asynchronous vertices and thus three synchronous execution areas 151, 152 and 153 surrounded by the dotted lines are obtained. The execution order of those areas starts from the flowing-in and flowing-out order from the vertex 131 to the vertex 137, and the order follows the areas 151, the area 152 and finally attains the area 153. Thus, as the procedure structure, three procedure blocks 251, 252 and 253 shown in FIG. 10 (b) are obtained. Those procedure blocks are executed by control loops 261, 262 and 263, respectively, and processing of 271 and 272, processing from 273 to 279 and processing from 280 to 283 are executed on the respective loops.

With regard to an area group corresponding to a 1-way circuit to which the data driven system or the back tracking system is applied, execution needs to be started many times until the timing indication flags or the re-evaluation flags disappear. Consequently, an upper level procedure block incorporating the procedure block group corresponding to this area group is provided and execution of the upper level block is repeated until evaluation of the constraint by the data driven system or the back tracking system is completed.

As described in the foregoing, according to the embodiment of the present invention, by analyzing a program specification, portions where flows of calculation execution timing for respective set elements synchronize, and portions where flows of execution timing do not synchronize are detected, and different method are used for the portions where flows of execution of timing synchronize and the portions where flows of execution timing do not synchronize. Thus, the programmer can describe a program specification by descriptive elements having characteristics of sets and mappings without being conscious of structure clashes and it is possible to automatically design a program structure having a high execution efficiency by detecting and solving structure clashes in input/output data from the program specification easy to describe and to understand.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for automatically designing a structure of a program represented by a procedural programming language from a program specification described by a nonprocedural program specification description language, having: descriptive elements having characteristics of sets, and descriptive elements having characteristics of mappings for mapping set elements in said sets; and descriptive elements for defining a necessary calculation method for obtaining values of the set elements mapped by said mappings;
   said method comprising:
   a first step of detecting a portion where flows of execution timing of said calculation with respect to the respective set elements synchronize and a portion where flows of execution timing of said calculation do not synchronize, by analyzing said program specification; and
   a second step of defining a data structure and a procedure structure as the program structure by handling said portion where the flows of execution timing synchronize and said portion where the flows of execution timing do not synchronize by different methods.

2. A method for automatically designing a program structure in accordance with claim 1, wherein
said first step comprises the steps of:
mapping the descriptive elements having the characteristics of sets described in said program specification and the descriptive elements defining the calculation method with vertices and drawing arcs based on the descriptive elements defining the calculation method between said vertices, thereby preparing a directed graph, and
analyzing said prepared directed graph in view of the characteristics of sets and mappings and global characteristics of the directed graph and detecting arcs and vertices where flows of execution timing of the calculation synchronize and arcs and vertices where flows of execution timing of the calculation do not synchronize,
second step comprises the steps of:
assigning a data area capable of storing only one data belonging to each of the sets to each of the vertices where the flows of execution timing of the calculation synchronize out of the vertices mapped with the descriptive elements having the characteristics of sets, and assigning a data area capable of storing all data belonging to each of the sets to each of the vertices where the flows of execution timing do not synchronize, thereby defining the data structure, and
dividing the directed graph into connective directed sub-graphs so that the vertices where the flows of execution timing do not synchronize are boundary vertices of the sub-graphs, the vertices where the flows of execution timing synchronize are internal vertices of the sub-graphs and the arcs where the flows of execution timing synchronize connected through a vertex are included in the same sub-graph, assigning procedure blocks to the respective sub-graphs, and assigning procedures to the respective vertices, thereby defining the procedural structure.

3. A method for automatically designing a program structure in accordance with claim 1, wherein
the descriptive elements having the characteristics of sets include entity types, relationship types and data types, and attributes are defined for the respective entity types,
said descriptive elements having the characteristics of mappings include relationship types, and
said descriptive elements for defining said calculation method include constraints.

4. A method for automatically designing a program structure in accordance with claim 3, wherein
said first step comprises the steps of:
mapping, with vertices, the entity types, the attributes, the relationship types, the data types and the constraints described in said program specification, and drawing arcs based on the constraints between the vertices, thereby preparing a directed graph, and
analyzing said prepared directed graph in view of the characteristics of sets and mappings and global characteristics of the directed graph, and detecting the arcs and vertices where the flows of execution timing of the constraint synchronize and the arcs and vertices where the flows of execution timing do not synchronize,
said second step comprises the steps of:
assigning a data area capable of storing only one of entities, attribute values, relationships or data to each of the vertices where the flows of said execution timing synchronize out of the vertices of the entity types, the attributes, the relationship types and the data types, and assigning a data area capable of storing all of entities of the same type, all of values of the same attribute, all of relationships of the same type or all of data of the same type to each of the vertices where the flows of said execution timing do not synchronize, thereby defining the data structure, and
dividing the directed graph into connective directed sub-graphs so that the vertices where the flows of said execution timing do not synchronize are boundary vertices of the sub-graphs, the vertices where the flows of said execution timing synchronize are internal vertices of the sub-graphs, and the arcs where the flows of said execution timing synchronize connected through a vertex are included in the same sub-graph, assigning procedure blocks to the respective sub-graphs, and assigning procedures to the respective vertices, thereby defining the procedural structure.

* * * * *